G. F. BUCKLE AND F. PARFETT.
COURSE INDICATOR OR THE LIKE.
APPLICATION FILED FEB. 12, 1920.
1,380,768.
Patented June 7, 1921.
6 SHEETS—SHEET 1.
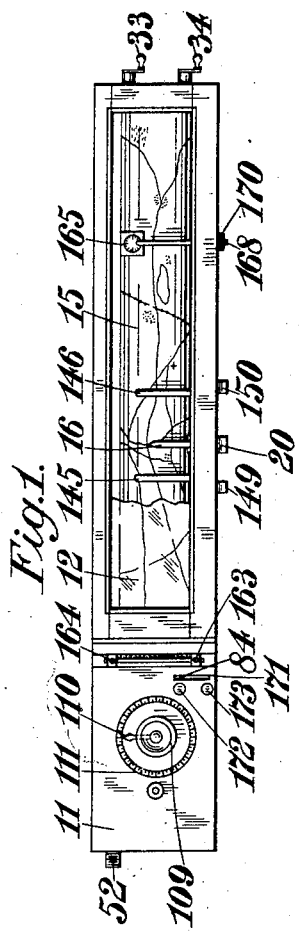
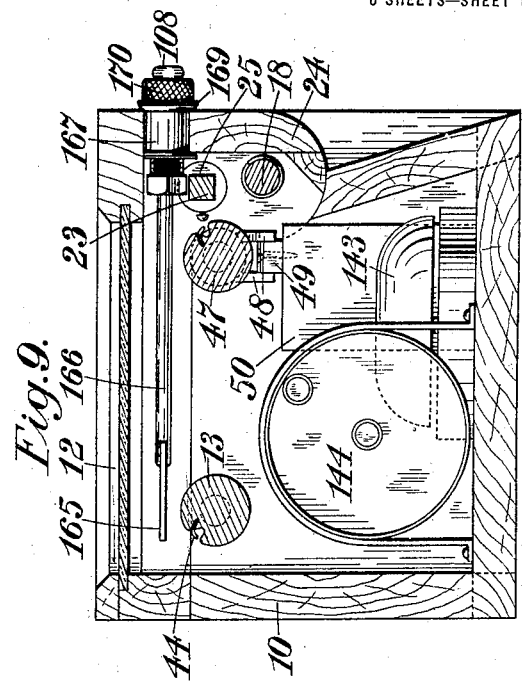
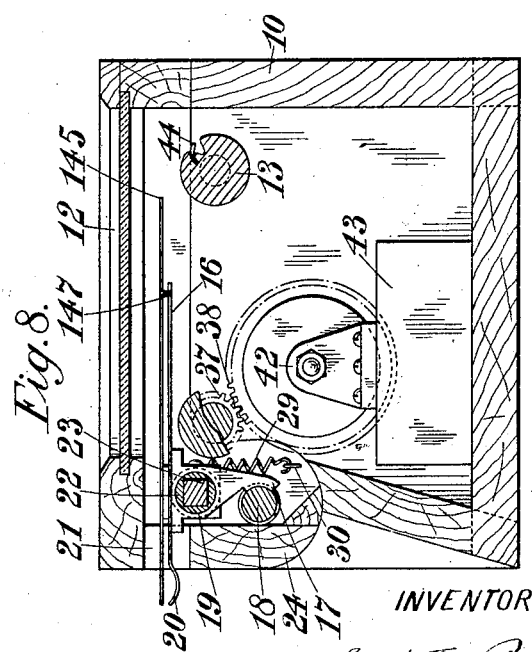
INVENTORS.

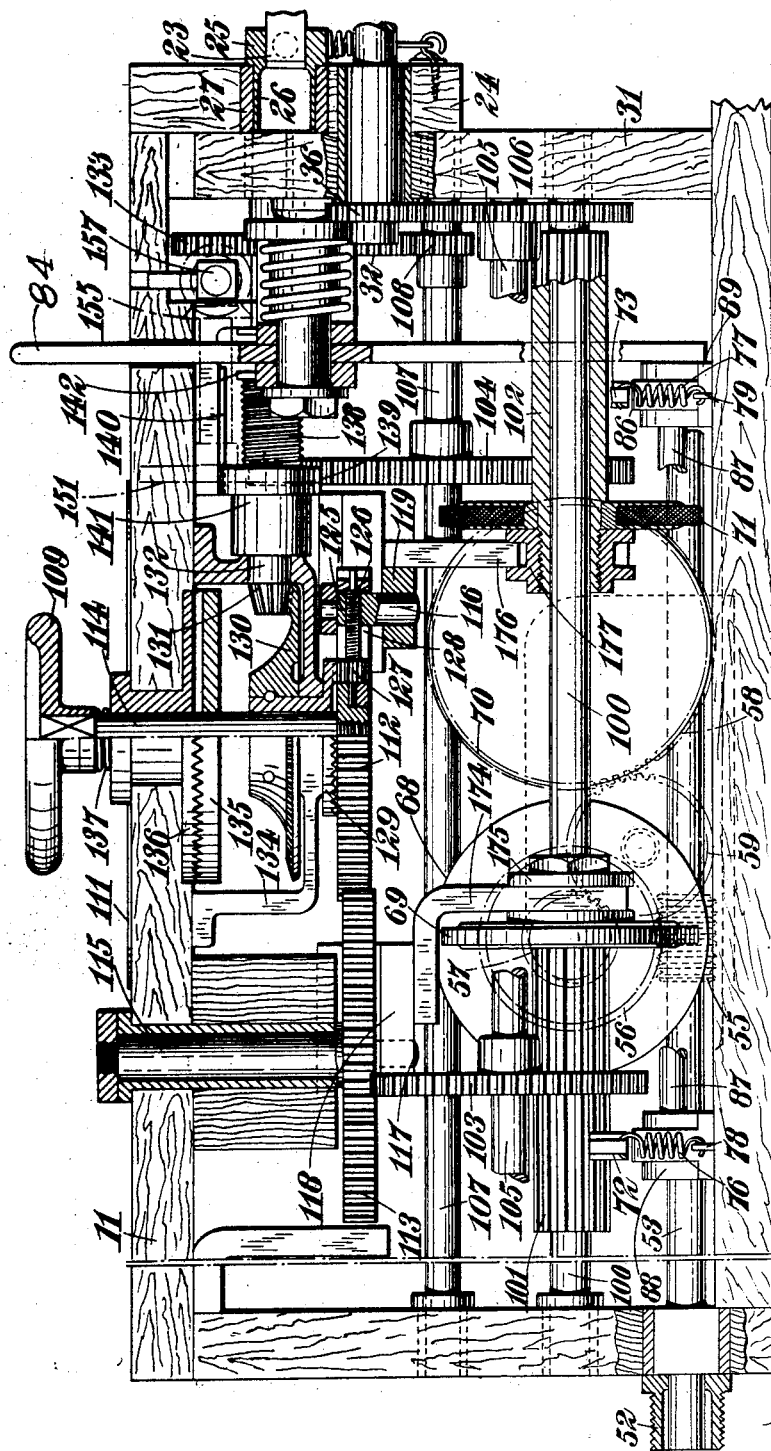

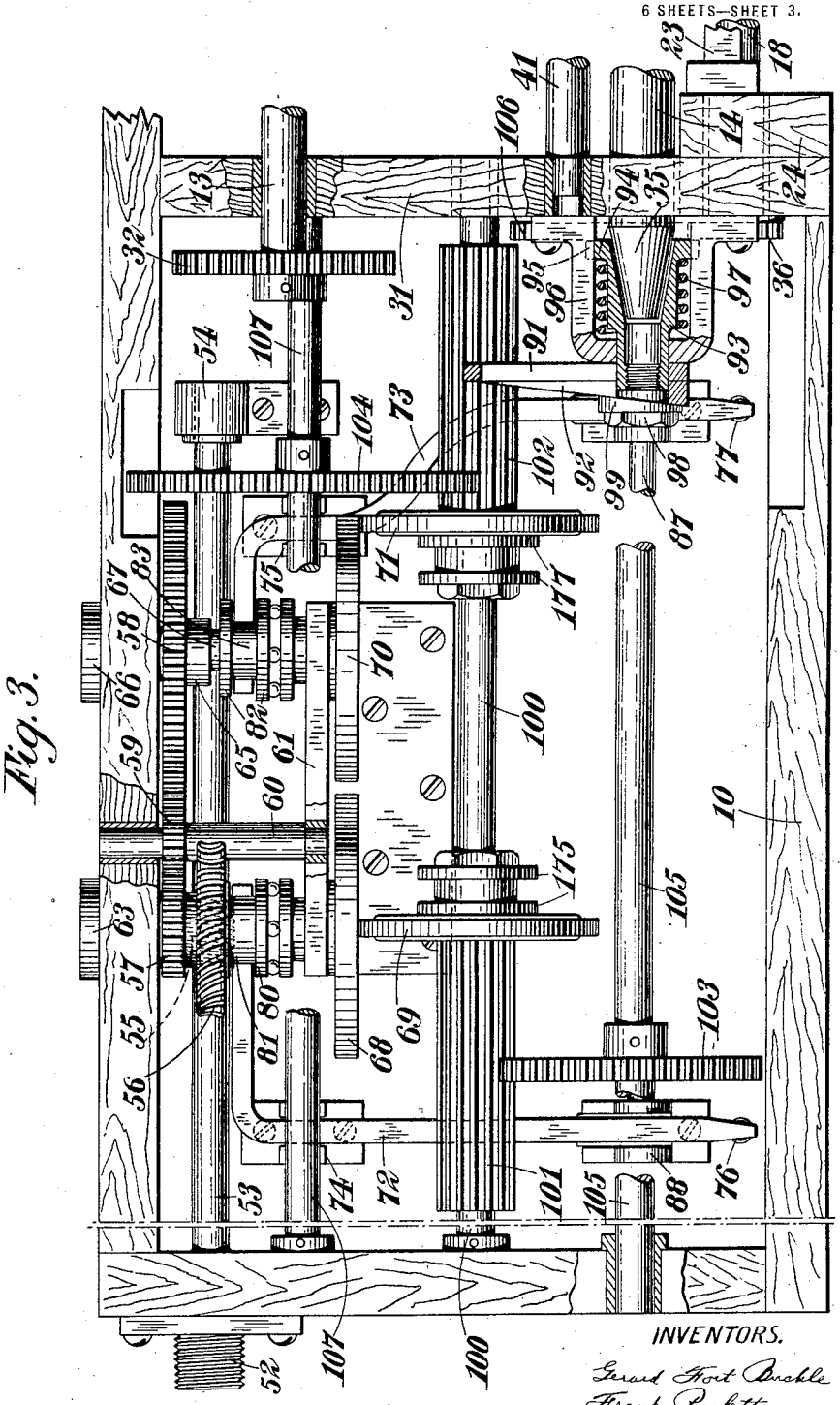

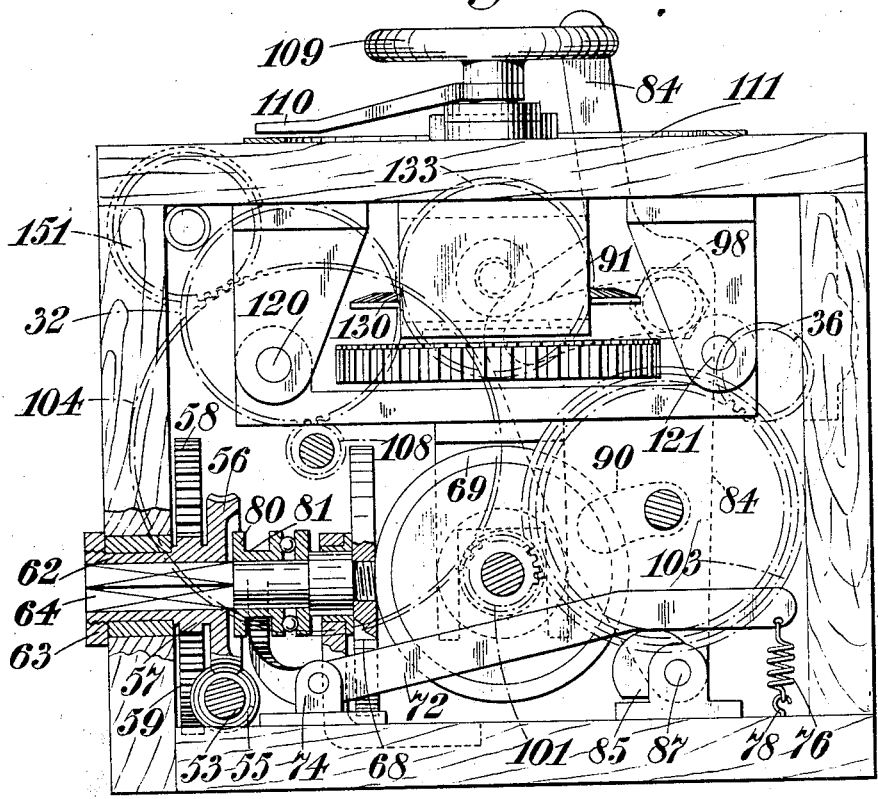

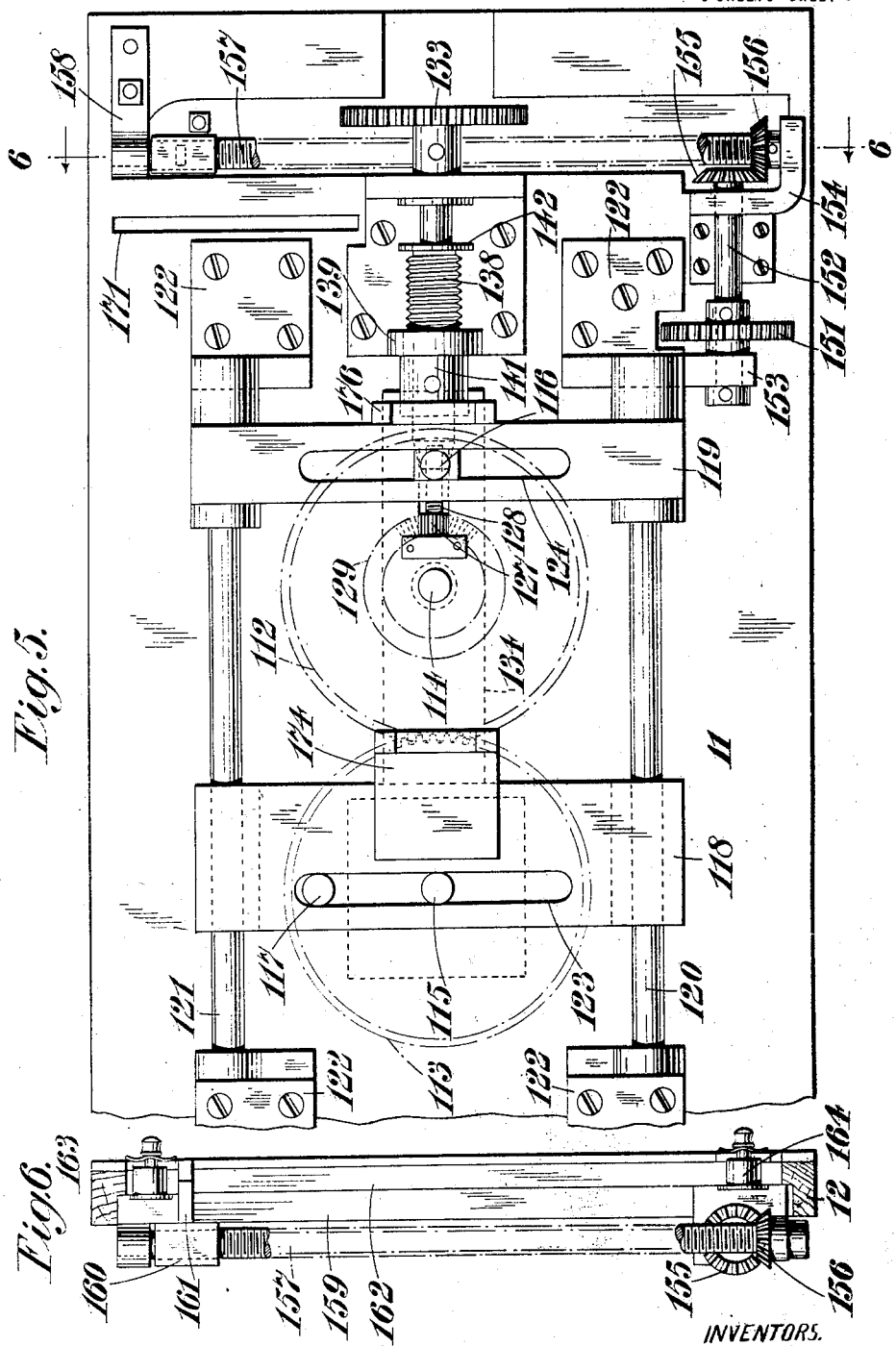

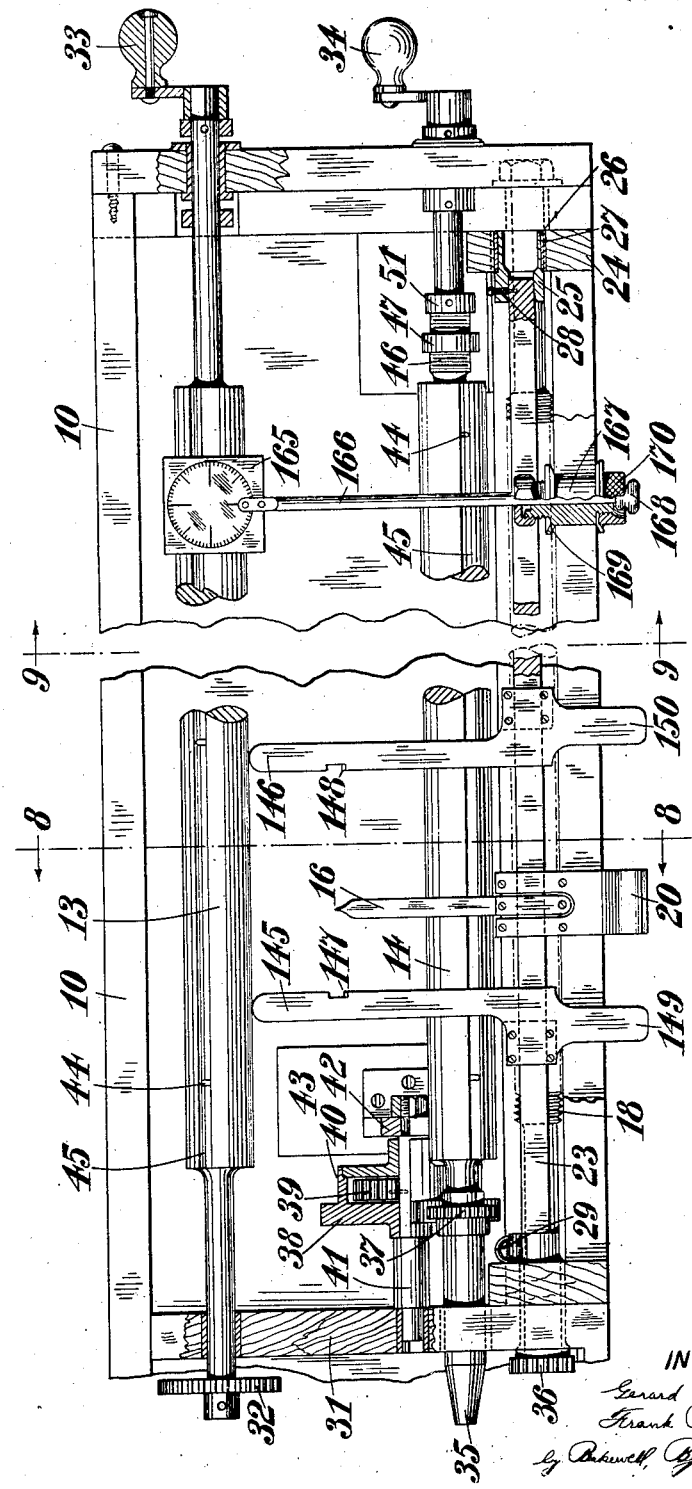

UNITED STATES PATENT OFFICE.

GERARD FORT BUCKLE, OF ST. LEONARDS-ON-SEA, AND FRANK PARFETT, OF LONDON, ENGLAND; SAID PARFETT ASSIGNOR TO SAID BUCKLE.

COURSE-INDICATOR OR THE LIKE.

1,380,768. Specification of Letters Patent. Patented June 7, 1921.

Application filed February 12, 1920. Serial No. 358,226.

*To all whom it may concern:*

Be it known that we, GERARD FORT BUCKLE and FRANK PARFETT, subjects of the King of England, residing at St. Leonards-on-Sea, Sussex, England, and Forest Hill, London, S. E. 23, England, respectively, have invented certain new and useful Improvements in Course-Indicators or the like, of which the following is a specification.

This invention is for improvements in or relating to course indicators or the like. It has particular reference to course indicators or the like of the type comprising two driven members mounted to be moved rectilinearly in the same plane or in parallel planes but in directions at right angles to each other to indicate a course or the like by the resultant of their movements.

In one form of course indicator of this type which has been previously proposed there is provided a driving train of gearing for each driven member, means including a pair of friction disks for varying the speed of drive through a cycle down from and up to the maximum speed by relatively moving the friction disks of each pair, such speed variations of the two drives being as the sine and cosine of the angles between stationary and rotary radii of a circle, and a single control adapted to be set according to the course or the like and connected to both speed-varying means for regulating them simultaneously, the relative setting of the speed-varying means being such as to maintain between them, throughout their cycles, a predetermined difference of phase relationship to the extent of that portion of a cycle corresponding to the speed change from maximum to zero. In this previously proposed construction, the friction disks in each pair are adjusted relatively to each other by a crank, the two cranks, one for each drive, being set at an angle of 90° relatively to each other, and being rotated by the single control aforesaid. This angle of 90° gives the desired difference of phase relationship.

The present invention has for one of its objects to provide an improved construction of course indicator or the like which while being particularly suitable for use upon motor cars or other road vehicles is also suitable for use in other circumstances. Another object of the present invention is to provide a construction of mechanism such that the driver of a car or other vehicle can readily follow on a map the progress of his journey.

According to one feature of the present invention there is provided a course indicator or the like of the type above described in which one driven member takes the form of a map or other sheet which is unrolled from one roller on to another, and the other driven member takes the form of a finger or pointer which is moved across the sheet transversely of the direction of movement of the latter.

According to another feature of the present invention there is provided a course indicator or the like of the type above described, in which the speed of the said driven members is relatively varied according to the course or the like, through a speed-varying gear, by a controlling device comprising in combination a setting member adapted to be rotated into a position to correspond to the course or the like, a disk or the equivalent one for each driven member, both of said disks being geared to the said member to be rotated thereby, a pin eccentrically situated in each disk, said disks being so set relatively to each other that the pin in one is displaced through an angle of 90° relatively to the corresponding position of the pin in the other, and two slotted adjusting members one connected to the speed-varying gear for each driven member, said adjusting members being mounted to slide along guideways to adjust the speed-varying gear, and each receiving in its slot one of the said pins, whereby rotation of the disks is translated into longitudinal movement of the said adjusting members.

According to a further feature of the invention there is combined with the driving gear for the map or other sheet automatic means for regulating the speed of drive in accordance with the increase in the operative diameter of the roller on to which the sheet is being wound. Conveniently also there may be combined with the driving means for the sheet rollers, means for stopping the drive of the rollers automatically after a predetermined length of sheet has been wound from one roller onto the other.

According to another feature of the invention there is combined with the driven members adjustable alarm devices arranged to be operated when the driven members reach a selected point in their travel.

For a more complete understanding of these and other features of the present invention there will now be described, by way of example only and with reference to the accompanying drawings, one constructional form of course indicator according to the invention. It is to be understood, however, that the invention is not limited to the precise constructional details enumerated.

In these drawings:—

Figure 1 is a plan on a reduced scale of one form of course indicator according to the invention, Fig. 2 is a vertical longitudinal section showing the portion of the mechanism toward the left hand in Fig. 1 on a scale larger than that of this latter figure, Fig. 3 is a plan view corresponding to Fig. 2 with the upper portion of the mechanism removed, Fig. 4 is an end view partly in section of the parts shown in Fig. 2, Fig. 5 is an under plan of the upper portion of the mechanism shown in Fig. 2, Fig. 6 is a section on the line 6—6 of Fig. 5, Fig. 7 is a plan partly in section showing the portion of the mechanism toward the right hand in Fig. 1 on a scale larger than that of this latter figure but different from the scale of Fig. 2, Fig. 8 is a section on the line 8—8 of Fig. 7, and Fig. 9 is a section on the line 9—9 of Fig. 7.

Like reference numerals refer to like parts throughout the drawings.

The course indicator according to the present invention is suitable for use on any vehicle or other body moving relatively to the earth's surface and the path of which can be traced, as on a map, and comprises a box or casing 10 which may be secured say to the dashboard of a motor car or in any other convenient position on the vehicle. The portion to the left hand in Fig. 1 has a closed fixed top 11 and the portion to the right hand in Fig. 1 has a hinged glazed top or lid 12. Below the lid 12 is a pair of rollers 13, 14 on which a map or other sheet 15 is received. The rollers 13 and 14 are mounted parallel to each other and the sheet 15 is intended to be unrolled from one roller on the other. The roller 13 is coupled by gearing to driving mechanism and the roller 14 is spring controlled to maintain the sheet 15 taut. It will be appreciated that the portion of the sheet lying between the two rollers will, during rotation of the rollers, be moving rectilinearly. To coöperate with the sheet 15 there is provided a finger, marker or pointer 16 which is moved across the sheet transversely of the direction of movement of the latter. This pointer also moves rectilinearly and its direction of movement is at right angles to the direction of movement of the sheet and is in the same plane or a plane parallel thereto. The pointer 16 includes a nut portion 17 engaging upon a screwed spindle 18 along which it traverses the length of the spindle. The nut portion 17 is formed as an extension from a bearing 19 attached to a finger piece 20 for the pointer 16. The finger piece 20 extends to the outside through a slot 21 running longitudinally along that portion of the casing 10 lying below the lid 12. The bearing 19 is provided with an ebonite or other insulating bush 22 through which passes a rectangular guide rod 23. The rod 23 lies parallel to the spindle 18 and it is supported at both ends in side pieces 24 depending from the lid 12. These side pieces 24 also embrace the ends of the spindle 18 which serves as the hinge for the lid. The rod 23 is received at each end in a squared socket formed in a sleeve 25 which has a circular portion 26 mounted to rotate in a bush 27 in the side piece 24. The rod 23 is secured in place in the sockets in the sleeves 25 by screwed pins 28 and one of these pins 28 is employed to hold in place one end of a spring 29, the other end of which is received by an eye 30 in one of the depending side pieces 24. It will be clear from an inspection of Fig. 8 that the action of this spring 29 will be to tend to maintain the nut portion 17 in engagement with the screw threads upon the spindle 18. Thus the nut portion 17 is spring pressed into engagement with its driving spindle 18 but may be disengaged therefrom when it is desired to adjust the pointer 16 along the spindle.

The casing 10 is divided into two compartments by a partition 31, the one compartment being below the closed top 11 and the other below the hinged lid 12. This partition 31 is provided with bearings which receive one end of each of the rollers 13 and 14 and of the spindle 18, the other ends of the rollers and of the spindle being mounted in bearings at the end of the casing 10. One end of the roller 13 projects into the left hand compartment and carries there a gear wheel 32. The other end of this roller projects outside the casing and is provided with an operating handle 33. The corresponding end of the roller 14 also projects outside the casing and is provided with an operating handle 34. The other end of the roller 14 projects through the partition 31 into the left hand compartment and is there formed with a conical portion 35 for a purpose to be hereinafter pointed out. The end of the spindle 18 which projects through the partition 31 into the left hand compartment is there provided with a gear wheel 36. The gear wheels 32 and 36 receive drive from the mechanism contained in the left hand compartment. Inside the right hand compartment the roller 14 is provided with a gear wheel 37 meshing with a wheel 38 driven by a coiled spring 39 contained inside a drum 40. The wheel 38 and drum 40 are mounted upon a spindle 41 which is carried at one end in the partition 31 and at the other end in a bearing 42 supported upon a block 43 attached to the casing 10. Thus tension upon the spring 39 will tend to rotate the roller 14 and the rotation thus imparted will be in the direction to maintain the sheet 15 upon the rollers taut. The sheet 15 may conveniently be provided with eyelets to be engaged with hooks 44 placed at convenient distances along grooves 45 in the rollers 13 and 14.

At its end remote from the wheel 37 the roller 14 has a reduced threaded portion 46 upon which is a nut 47. This nut has downwardly extending projections 48 which receive between them (see particularly Fig. 9) a strip 49 mounted upon a block 50 secured to the casing. By this means rotation of the nut 47 is prevented and it is therefore caused to travel along the threaded portion 46 of the roller 14 as the latter rotates. The extent of travel of the nut 47 is limited at one end of the threaded portion 46 by the full diameter of the roller 14 and at the other end by a collar 51. This nut serves to prevent the damage or disarrangement which might be caused by excessive rotation of the roller 14 either by the spring 39 or the handle 34.

The rollers and the pointer spindle are each provided with a driving train of gearing connecting them to the main drive which in a motor car could conveniently be taken from the road wheels in a similar manner to that done with speedometers. In the construction illustrated a screwed member 52 projects to the exterior of the left hand compartment and this member assists to connect the main drive to the mechanism in the casing 10. Reaching into the member 52 to pick up the main drive is a shaft 53 lying inside the left hand compartment and mounted at one end in the end wall of the casing 10 and at the other end in a suitable bearing 54 inside the casing. The speed of the rollers and pointer spindle has to be correlated to the scale of the map and a suitable speed reduction will in most cases be requisite. This may be secured in many ways. In the construction shown a portion is obtained by providing the shaft 53 with a worm 55 meshing with a worm wheel 56 from which latter are driven two master gear wheels 57 and 58 one for the sheet rollers 13 and 14 and the other for the pointer spindle 18. The master gear wheels 57 and 58 are coupled by an idler 59 mounted upon a shaft 60 which at one end is mounted in a bearing in the casing 10 and at the other end in a bracket 61 carried by the casing. The worm wheel 56 and gear wheel 57 are mounted upon or formed integral with a tubular shaft 62 received in the casing 10 and projecting to the exterior thereof to receive a locking collar 63. The interior of the tubular shaft 62 is squared and receives the squared end of a shaft 64 the other end of which is mounted in the bracket 61. The gear wheel 58 is mounted upon a tubular shaft 65 which projects to the exterior of the casing to receive a locking collar 66 and which is squared internally similarly to the shaft 62. The tubular shaft 65 receives the squared end of a shaft 67 the other end of which is mounted in the bracket 61, similarly to the shaft 64.

The gear wheel 57 drives the train for the pointer spindle 18 and the gear wheel 58 drives the train for the sheet rollers. Each driving train includes a pair of friction disks 68 and 69, and 70 and 71 respectively, whereby the desired speed changes and reversals of the sheet rollers and pointer spindle are obtained. One of each pair of friction disks, namely the disks 68 and 70 may conveniently be longitudinally movable toward and from its coöperating friction disk (69 and 71 respectively) and be combined with a spring pressed member tending normally to maintain it in engagement with the coöperating disk. The disk 68 is attached to the end of the shaft 64 and the disk 70 is attached to the end of the shaft 67. The squared portions of these two shafts can slide in the squared interiors of the shafts 62 and 65 so that the disks 68 and 70 may be longitudinally moved relatively to their coöperating disks without breaking the driving connection between the disks 68 and 70 and the gear wheels 57 and 58 respectively. To press the disks 68 and 70 into engagement with their coöperating disks, a pair of spring controlled levers 72 and 73 may be employed. The lever 72 is pivoted intermediate its ends in a bearing 74, and the lever 73 is similarly pivoted at 75. To one end of each of the levers 72 and 73 is attached a spring 76, 77 respectively, anchored to the casing 10 by loops or eyes 78, 79. The lever 72 just beyond its bearings 74 is bent at right angles to reach between the flanges 80 of a collar 81 secured to the shaft 64. The lever 73 to suit the arrangement of the mechanism is somewhat different in shape from the lever 72. Beyond its bearing 75 it is bent to reach between the flanges 82 of a collar 83 mounted upon the shaft 67. Thus under the influence of the springs 76 and 77 the levers 72 and 73 will tend to maintain the disks 68 and 70 in operative contact with the disks 69 and 71 respectively. These latter disks may conveniently have fiber rims to secure a good driving contact. The levers 72 and 73 constitute a convenient means of stopping the drive when desired and they may be controlled by a single operating member 84 projecting to the exterior of the casing 10 for manual operation. This operating member 84 may be connected to a pair of cams 85 and 86 one to engage each lever 72, 73 to rock it in the direction to disengage the friction disks when desired. The cams 85 and 86 are mounted upon a shaft 87 to the end of which the operating member 84 is connected. This shaft is carried in bearings 88, 89 attached to the casing 10. Thus when the operating member 84 is rocked the cams 85, 86 will engage the levers 72 and 73 and withdraw the friction disks 68 and 70 from their coöperating disks 69 and 71. The operating member 84 is slotted at 90 and 91 as shown in Fig. 4 to clear various other parts of the mechanism, and it projects through a slot 171 in the closed top 11 of the casing. Its two operative positions along the slot 171 corresponding to "gear in" and "gear out" are indicated by studs 172 and 173 respectively on the outside of the portion 11 of the casing.

Where a spring controlled sheet roller such as 14 is employed as aforesaid it is advantageous to provide that roller with braking means to prevent the roller spring 39 from causing undesired movement of the rollers when the main drive has been cut off. For this purpose, therefore, the operating member 84 just described may be provided with a wedging surface 92 (see particularly Fig. 3) to engage and operate the braking means for the roller when the said operating member is brought into position to cut off the main drive. The braking means may consist of the conical surface 35 hereinbefore referred to, on the sheet roller 14 and a coöperating spring pressed conical member 93 tending normally to move into braking position. The member 93 has a flange 94 at one end with projections or lugs 95 upon it which engage a groove or recess in a casing member 96 attached to the partition 31. Rotation of the member 93 is thereby prevented but longitudinal sliding motion permitted. A spring 97 is placed around the member 93 between the flange 94 on the latter and the end of the casing member 96 and tends normally to move the member 93 into engagement with the conical surface 35 to effect the braking. The end of the member 93 remote from the flange 94 is screwed internally to receive the end of a set-screw 98 which has between its head and the wedging surface 92 a washer 99. The slot 91 in the operating member 84 embraces the braking member 93 and thus as the operating member is moved from one to the other of its operative positions the wedging surface 92 and spring 97 will coöperate to move the braking members 93 into or out of braking position according to circumstances. The operating member is shown in the drawings in its position corresponding to normal running of the mechanism. The disks 68 and 70 are being pressed into operative engagement with the disks 69 and 71 respectively and the braking member 93 is being held out of operative engagement with the conical surface 35. No impediment will, therefore, be offered by the member 93 to the unrolling of the sheet 15 from the roller 14 on to the roller 13. When, however, the operating member 84 is moved into its other extreme position not only will the disks 68 and 70 be withdrawn from operative engagement with the disks 69 and 71 respectively, but the spring 97 will be permitted to slide the braking member 93 into operative engagement with the conical surface 35 and thus undesired rotation of the sheet rollers by the spring 39 will be prevented.

To obtain the necessary speed variations of the sheet rollers and pointer spindle the friction disks 68, 69 and 70, 71 included in their driving trains have to be relatively moved. In the construction shown the friction disks 69 and 71 are mounted to be moved transversely across the operative surface of the endwise slidable disks 68 and 70. Conveniently, both of these disks 69 and 71 are mounted upon a single guiding rod 100 along which they can slide as desired, and are provided with extended sleeves 101, 102 respectively, with long teeth which mesh with gear wheels 103, 104 to take the drive from the disks 69 and 71 whatever position they may occupy along their guiding rod 100. The gearing taking the drive from the toothed sleeves 101 and 102 may provide for any desired speed reduction. The gear wheel 103 is mounted upon a shaft 105 which is carried at one end by the casing 10 and at the other end by the partition 31. Also mounted on the shaft 105 is a gear wheel 106 which meshes with the gear wheel 36 on the pointer spindle 18. The wheel 104 is mounted upon a shaft 107 which like the shaft 100 is carried at one end by the casing 10 and at the other end by the partition 31. The shaft 107 also carries a gear wheel 108 which meshes with the wheel 32 on the roller 13. Thus the drive from the sleeves 101 and 102 is transmitted respectively to the pointer spindle and the sheet rollers.

In indicating a route or course by the resultant of the motions of the sheet and pointer, it is necessary to adjust the relative speeds of these two driven members according to the direction of the course and by means of the friction disks 69 and 71 this can be done through a cycle down from maximum speed forward through zero to maximum speed reverse. To secure correct results, the speed variations of the two drives should be as the sine and cosine of the angles between stationary and rotary radii of a circle, and throughout their cycles there should be maintained a predetermined difference of phase relationship. This phase difference should be to the extent of that portion of a cycle corresponding to the speed change from maximum to zero, namely an angle of 90°. A single control is provided which is adapted to be set according to the course or the like and it is connected to both speed-varying means for regulating them simultaneously. When this control is brought into a position to correspond to the course or the like the sheet and pointer will move at the necessary speeds to indicate or record by the resultant of their motions the course upon the sheet. The single control in the construction shown is a rotary handle 109 which is situated above the closed portion 11 of the casing. It is provided with an indicator 110 moving over a scale plate 111 and is so arranged in relation to the sheet and pointer that the indicator 110 upon the control is to be brought into such a position as to lie parallel to the direction of the course over the sheet 15.

Conveniently the setting or controlling member 109 is combined with two disks one (112) for regulating the drive to the rollers and the other (113) for regulating the drive to the pointer, both of said disks being geared to the setting member 109 to be rotated thereby. The disk 112 is mounted upon the lower end of the shaft 114 the upper end of which carries the setting member 109, and this disk is toothed externally to gear with corresponding teeth on the disk 113. The disk 113 is mounted upon a shaft 115 carried in a suitable bearing by the closed portion 11 of the casing. Eccentrically situated in each disk 112 and 113 is a pin 116 and 117 respectively, and the said disks are so set relatively to each other that the pin in one is displaced through an angle of 90° relatively to the corresponding position of the pin in the other. By this means the difference in phase relationship referred to above is secured. This setting of the pins will be clear from an inspection of Fig. 5. Connected one to each of the disks 69 and 71 are two slotted adjusting members 118, 119 respectively which are mounted to slide along guideways 120 and 121 to adjust the said disks in position. The guides 120 and 121 are mounted in bearings 122 secured underneath the top portion 11 of the casing. The adjusting member 118 is slotted at 123 to receive the pin 117 and the adjusting member 119 is slotted at 124 to receive the pin 116 and the length of the slots 123 and 124 is such as to permit of complete rotation of the disks 112, 113 carrying the pins. The adjusting member 118 carries a fork 174 which engages between the flanges 175 of an extension from the disk 69, and similarly the adjusting member 119 carries a fork 176 which engages between the flanges 177 of an extension from the disk 71. By this construction rotation of the disks 112, 113 is translated into longitudinal movement of the said adjusting members and consequently into speed-changing movement of the friction disks 69 and 71. Thus it is insured that the speed variations imparted to the sheet and pointer, shall be as the sine and cosine of the angles between the stationary and rotary radii of a circle.

It will be appreciated that in order to obtain correct results the speed of the sheet should not vary otherwise than in accordance with the speed of the main drive plus any variations intentionally imposed by the speed-varying gear just described. If, however, there is adopted the method of driving the sheet which is as described above and which consists in unrolling it between a spring controlled roller and a positively driven roller, as more and more of the sheet is wound on to one or other of the rollers the speed of the sheet will increase due to the increase in the operative diameter of the roller. According to one feature of the present invention there may be provided automatic means for superimposing a correction to provide against this increase in the sheet speed occurring. These means comprise mounting the pin 116 in the speed-varying gear for the rollers, upon a nut 125 which is received upon a threaded spindle 126 carried in a suitable slot 128 in the disk 112. The size of this slot 128 is such as to permit the nut 125 to move longitudinally along the spindle 126 but not to rotate about the latter. This threaded spindle 126 carries a gear wheel 127 which is driven from the driving train for the rollers and thus during the progress of winding the sheet from one roller on to the other the nut 125 and pin 116 will be traversed along their threaded spindle 126. This spindle 126 is mounted upon the disk 112 in a radial direction so that traverse of the nut 125 along the spindle will bring the nut nearer to or further from the center of rotation of the disk. Consequently the disk 71 will receive the necessary adjustment. In the construction illustrated the gear wheel 127 upon the spindle 126 receives its drive from a crown wheel 129 concentric with, but loose upon a shaft 114. This crown wheel 129 is integral with or attached to an oppositely facing crown wheel 130 which meshes with a gear wheel 131 driven from the driving train for the sheet rollers. The gear wheel 131 is carried upon one end of a shaft 132 which has toward its other end a gear wheel 133 which meshes with the wheel 32 on the roller 13. The shaft 132 is carried at one end in a bearing 140 attached to the top portion 11 of the casing and at the other end in a bearing 134 also attached to the top portion 11 of the casing and supporting the shaft 114 and crown wheels 129 and 130. With the construction just described it will be seen that if the two crown wheels 129 and 130 are constantly in engagement with their respective gear wheels 127 and 131, adjustment of the setting member 109 will incidentally cause the pin 116 to be moved toward or from the center of the disk 112 upon which it is mounted. This, of course, is undesirable and to prevent it there is provided means for securing disengagement of the gear wheel 127 from its crown wheel 129 when the setting member 109 is being rotated to vary the drive imparted to the sheet roller. For this purpose the shaft 114 upon which the setting member 109 and the disk 112 are mounted is longitudinally movable, irrespective of the the crown wheels 129 and 130 and is provided with a serrated or toothed locking disk 135. The shaft 114 and its locking disk 135 are normally pressed by a spring 137 automatically into locking engagement with a stationary disk 136 and when in this position the crown wheel 129 is in engagement with the gear wheel 127 upon the spindle 126. To adjust the setting member 109, however, the shaft thereof has to be moved longitudinally (viz., pressed down) sufficiently to disengage the locking disks 135 and 136 and this movement also operates to disengage the gear wheel 127 from the crown wheel 129. Thus rotation of the setting member 109 will not cause variation in radial position of the adjusting pin 116 relatively to its threaded spindle 126.

To prevent disturbance of the setting of the various parts of the mechanism, means are preferably provided for stopping the drive of the sheet automatically after a predetermined length of sheet has been wound from one roller on to the other. These means may take the form of a threaded portion 138 on the shaft 132 which receives a nut 139. This nut 139 is mounted to travel along the spindle 138 during the rotation of the latter and is itself prevented from rotation by engagement with the member 140 on the top portion 11 of the casing. Abutments 141 and 142 on the spindle 138 are so situated in relation to the nut 139 that the latter is brought into engagement with them when the drive of the sheet rollers is to be stopped.

For some purposes it may be desirable to inform the operator automatically when a particular point along the course is reached, for example when a bend in a road is encountered where it is necessary to readjust the setting member 109 to correspond with the different speeds of the sheet and pointer required. These alarm devices may be of any suitable character. One form consists of an electric bell 143 which is provided with one or more fixed contacts and a moving contact. When the moving contact reaches a fixed contact an operating circuit, including a battery 144, is closed and the bell is rung. One of these alarm devices may be geared to each driving train if desired. In the construction shown the pointer 16 is utilized as a moving contact and two relatively fixed but adjustable contacts 145 and 146 are provided to coöperate therewith. The contacts 145 and 146 are provided with downturned portions 147 and 148 into engagement with which the pointer 16 can be brought during its travel along its spindle 18. The contacts 145 and 146 are mounted upon the rectangular bar 23 and have finger pieces 149 and 150 respectively projecting to the outside of the casing 10 through the slot 21. The contacts 145 and 146 are situated one at each side of the pointer 16 and are in electrical contact with the bar 23 along which they can be moved to any desired position. It will be remembered that the pointer 16 is insulated from the bar 23 by the bush 22, but it is in electrical contact with its spindle 18. If, therefore, the bar 23 is connected to one lead of the circuit which includes the battery 144 and bell 143 and the spindle 18 is connected to the other lead of this circuit, the circuit will be closed and the bell rung when the pointer 16 engages either of the projections 147 and 148. The operator will then be warned to adjust the setting member 109 to vary the relative speeds of the driving trains for the pointer and sheet rollers corresponding to a new direction of travel. The contacts 145 and 146 will provide for operation of the alarm consequent upon movement of the pointer. To provide for the alarm being given consequent upon movement of the sheet other contacts are provided. Meshing with the gear wheel 104 is a gear wheel 151 mounted upon a shaft 152 carried in bearings 153 and 154 secured to the top portion 11 of the casing. The shaft 152 also carries a bevel wheel 155 meshing with another bevel wheel 156 upon a screwed shaft 157. The shaft 157 is carried from the top portion 11 of the casing at one end in a part of the casing in a bearing 154 and at the other end in a bearing 158. The shaft 157 lies immediately below a slot 159 in the top portion 11 of the casing and carries a nut 160 having a projection 161 which reaches up into the slot 159 and prevents rotation of the nut as the spindle 157 is rotated. The nut 160 and its projection 161 constitute the moving contact for this set of alarm connections. Lying in the slot 159 is a rectangular bar 162 forming a guide for two movable contact pieces 163 and 164, and the projection 161 is situated between these two movable members. The contacts 163 and 164 are connected to one lead of an operating circuit for the alarm device and the nut 160 is connected to the other lead for this circuit. Thus the members 160, 163 and 164 will operate in a similar manner to the members 16, 145 and 146. By the coöperation of both sets of alarm devices any conditions prevailing regarding the driving of the pointer and sheet can be met.

The lid 12 is transparent, and mounted to slide both transversely and longitudinally over the sheet 15 there may be provided a direction finder consisting of a disk 165 of transparent material graduated to the various points of the compass. This disk 165 is secured to a rod 166 which passes through a bearing 167 to the outside of the casing and is there provided with a knob 168. By means of the knob 168 the rod 166 can be slid longitudinally through the bearing 167. The bearing 167 is formed of suitable proportions to slide freely in the slot 21 and it is provided with flanges or washers 169 to maintain it in position therein. A part 170, such as a securing nut, of the bearing 167 projects outside the casing in position to be grasped by the fingers of the operator. Thus by suitable adjustment of the bearing 167 in the slot 21 and of the rod 166 in the bearing 167 the disk 165 may be manually brought to any desired position over the sheet and thus the setting required to be imparted to the setting member 109 ascertained. The direction finder and the alarm contacts 145 and 146 may be hidden under panels in the lid 12 when not in use, if desired.

If desired a suitable illuminating device may be employed underneath or otherwise situated in reference to the sheet 15. As already stated the pointer 16 may be replaced by a recorder. This, instead of following a line along a map, could trace out a line upon a sheet.

It will be appreciated that in placing a map upon the rollers 13 and 14 any desired relation between these parts may be chosen. One convenient way is to arrange them so that the operation of rolling and unrolling the map will feed it in its N/S or S/N direction. In this event the direction of movement of the indicator 16 which is at right angles to the direction of movement of the map will be in the E/W or W/E direction. Then if the vehicle is traveling due N the map rollers will be required to be fed at their maximum speed while the indicator will not move at all, whereas if the vehicle is traveling due E the indicator will require to move at its maximum speed while the map rollers will not move at all. Again if the vehicle is traveling NE the map rollers and indicator will require to be driven at equal speed, but if the vehicle is traveling NNE the map rollers will require to be driven more quickly than the indicator.

One method of operating the device according to the present invention is as follows. Assuming that a route over a map which it is desired to follow has been determined, the direction finder disk 165 is brought over the map and adjusted until one or other of its graduations coincides more or less exactly with the route or a portion thereof. Assuming for example that the graduation in question is N which would be the case with the particular route on the map 15 with which the pointer 16 is registering as illustrated in Fig. 1. The setting member 109 will then be turned to the position which corresponds to N travel and which will be parallel to the radial direction of the graduation in question on the disk 165. This movement of the setting member 109 will adjust the two sets of speed-varying gear to their setting which corresponds to N travel, namely the disk 69 for the pointer will be brought into neutral position where it receives no drive from the disk 68 and the disk 71 for the map rollers will be brought into the position in which it receives the maximum speed of drive in the direction to unroll the map from the roller 13 on to the roller 14. This particular setting of the mechanism is illustrated in the drawings. Thus when once the indicator 16 has been manually adjusted to bring it into register with the route at the commencement, the map moving under it will as the vehicle proceeds on its journey, indicate the process of the vehicle along that route. If the graduation in question had been say NE, the setting of the member 109 to correspond therewith would have caused both the map and the indicator to move in such directions and at such speeds that the point of the indicator would relatively move in a northeasterly path over the map, corresponding to the chosen route. If the route being followed is of a devious nature it will be necessary at various points along it to impart fresh settings of the setting member 109 and the alarm devices hereinbefore described can be brought into operation to warn the operator when such fresh settings are necessary.

By the employment of the device according to the present invention it is possible for the driver of a vehicle to follow his progress exactly or almost exactly upon his map and this is of undoubted advantage to persons unfamiliar with the locality. In addition to indicating the progress of the journey, the invention will also permit a driver who is lost to determine his whereabouts.

It will be appreciated that the sheet may be fed either by the positively driven roller drawing it from the spring-controlled roller, or conversely allowing it to be wound on the latter.

What we claim as our invention and desire to secure by Letters Patent is: —

1. In a course indicator or the like the combination of two driven members, means for moving them rectilinearly in parallel planes but in directions at right angles to each other to indicate a course or the like by the resultant of their movements and means for adjusting the speeds of the two driven members comprising a setting member, means for rotating said setting member into a position to correspond to the said course, a disk one for each of the two driven members, gearing between said disks and the setting member whereby they may be rotated therefrom, a pin eccentrically situated in each disk, said disks being so situated relatively to each other that the pin in one is displaced through an angle of 90° relatively to the corresponding position of the pin in the other, two slotted adjusting members one connected to the speed-varying gear for each of the said driven members and guideways for the adjusting members, said adjusting members sliding along the guideways to adjust the speed-varying gear and each receiving in its slot one of the said pins whereby rotation of the disks is translated into longitudinal movement of the adjusting members.

2. In a course indicator or the like the combination of two driven members comprising a sheet and an indicator to coöperate therewith, means including speed-varying gear for moving the sheet rectilinearly in the plane in which it lies, means including speed-varying gear for moving the indicator in a plane parallel to the said plane of the sheet and in a direction at right angles to the direction of movement of the sheet, and means for coördinating the movement of the sheet and indicator to obtain a resultant corresponding to the movement of a vehicle in a course over the earth's surface, said coördinating means comprising a setting member, means for rotating the same into a position to correspond to the said course, a disk one for each of the two driven members, gearing between said disks and the setting member whereby they may be rotated therefrom, a pin eccentrically situated in each disk, said disks being so situated relatively to each other that the pin in one is displaced through an angle of 90° relatively to the corresponding position of the pin in the other, two slotted adjusting members one connected to the speed-varying gear for each of the said driven members and guideways for the adjusting members, said adjusting members sliding along the guideways to adjust the speed-varying gear and each receiving in its slot one of the said pins whereby rotation of the disks is translated into longitudinal movement of the adjusting members.

3. In a course indicator or the like, the combination of a sheet, an indicator to coöperate therewith, rollers between which the sheet extends, means for unrolling the sheet from one roller on to another, means for moving the indicator across the sheet, means for coördinating the movement of the sheet and indicator to obtain a resultant corresponding to the movement of a vehicle in a course over the earth's surface and automatic means for regulating the speed of unrolling the sheet in accordance with the increase in the operative diameter of the roller on to which the sheet is being wound.

4. In a course indicator or the like, the combination of a sheet, an indicator to coöperate therewith, rollers between which the sheet extends, means for unrolling the sheet from one roller on to another, means for moving the indicator across the sheet, means for coördinating the movement of the sheet and indicator to obtain a resultant corresponding to the movement of a vehicle in a course over the earth's surface, said coördinating means including a speed-varying mechanism in gear with the rollers, and automatic means for varying the setting of such speed-varying mechanism in accordance with the increase in the operative diameter of the roller on to which the sheet is being wound.

5. In a course indicator or the like, the combination of a sheet, an indicator to coöperate therewith, rollers between which the sheet extends, means for unrolling the sheet from one roller on to another, means for moving the indicator across the sheet, means for coördinating the movement of the sheet and indicator to obtain a resultant corresponding to the movement of a vehicle in a course over the earth's surface, said coördinating means including a crank pin controlling a speed-varying mechanism in gear with the rollers, and automatic means for varying the throw of such crank pin to vary the setting of the speed-varying mechanism in accordance with the increase in the operative diameter of the roller on to which the sheet is being wound.

6. In a course indicator or the like, the combination of a sheet, an indicator to coöperate therewith, rollers between which the sheet extends, means for unrolling the sheet from one roller on to another, means for moving the indicator across the sheet, means for coördinating the movement of the sheet and indicator to obtain a resultant corresponding to the movement of a vehicle in a course over the earth's surface, said coördinating means including a crank pin controlling a speed-varying mechanism in gear with the rollers, a nut carrying said pin, a threaded spindle along which the nut can travel as the spindle rotates and automatic means for rotating said spindle to vary the setting of the speed-varying mechanism in accordance with the increase in the operative diameter of the rollers on to which the sheet is being wound.

7. In a course indicator or the like, the combination of a sheet, an indicator to coöperate therewith, rollers between which the sheet extends, means for unrolling the sheet from one roller on to another, means for moving the indicator across the sheet, means for coördinating the movement of the sheet and indicator to obtain a resultant corresponding to the movement of a vehicle in a course over the earth's surface, said coördinating means including a crank pin controlling a speed-varying mechanism in gear with the rollers, a nut carrying said pin, a threaded spindle along which the nut can travel as the spindle rotates and operative connections between said spindle and the rollers to rotate the former as the sheet is wound from the one roller on to the other.

8. In a course indicator or the like, the combination of a sheet, an indicator to coöperate therewith, rollers between which the sheet extends, means for unrolling the sheet from one roller on to another, means for moving the indicator across the sheet, and means for adjusting the speeds of the sheet and indicator to obtain a resultant corresponding to the movement of the vehicle in a course over the earth's surface, said adjusting means comprising a setting member, means for rotating said setting member into a position to correspond to the said course, a rotary disk appropriated to the sheet, gearing between said disk and the setting member whereby it may be rotated therefrom, a pin eccentrically situated in said disk, a nut carrying said pin, a threaded spindle mounted on the disk along which the nut can travel as the spindle rotates and operative connections between said spindle and the rollers to rotate the former as the sheet is wound from the one roller on to the other.

9. In a course indicator or the like, combination of a sheet, an indicator to coöperate therewith, rollers between which the sheet extends, means for unrolling the sheet from one roller on to another, means for moving the indicator across the sheet, and means for adjusting the speeds of the sheet and indicator to obtain a resultant corresponding to the movement of the vehicle in a course over the earth's surface, said adjusting means comprising a setting member, means for rotating said setting member into a position to correspond to the said course, a rotary disk appropriated to the sheet, gearing between said disk and the setting member whereby it may be rotated therefrom, a pin eccentrically situated in said disk, a nut carrying said pin, a threaded spindle mounted on the disk along which the nut can travel as the spindle rotates a gear wheel on said spindle and carried by said disk, a rack operatively connected to the roller and meshing with the gear wheel during driving of the roller, and means for securing disengagement of the rack and gear wheel when the disk is being rotated to vary the drive imparted to the roller, for the purpose specified.

10. In a course indicator or the like, the combination of a sheet, an indicator to coöperate therewith, rollers between which the sheet extends, means for unrolling the sheet from one roller on to another, means for moving the indicator across the sheet, and means for adjusting the speeds of the sheet and indicator to obtain a resultant corresponding to the movement of the vehicle in a course over the earth's surface, said adjusting means comprising a setting member, means for rotating said setting member into a position to correspond to the said course, a rotary disk appropriated to the sheet, said disk being mounted to slide parallel to its axis of rotation, gearing between said disk and the said member whereby it may be rotated therefrom, a pin eccentrically situated in said disk, a nut carrying said pin, a threaded spindle mounted on the disk along which the nut can travel as the spindle rotates, a gear wheel on said spindle and carried by said disk, a rack operatively connected to the roller and meshing with the gear wheel during driving of the roller, a stationary locking collar, a second collar to coöperate therewith, said second collar being operatively connected to the said disk to be rotatable and slidable therewith and a spring tending to press the second collar automatically into locking engagement with the stationary collar, the pressure of said spring being overcome and the rack and gear wheel disengaged by the sliding movement of the rotary disk.

11. In a course indicator or the like, the combination of a sheet, an indicator to coöperate therewith, rollers between which the sheet extends, means for unrolling the sheet from one roller on to another, means for moving the indicator across the sheet, means for coördinating the movement of the sheet and indicator to obtain a resultant corresponding to the movement of a vehicle in a course over the earth's surface, and means for stopping the drive of the rollers automatically when a predetermined length of sheet has been wound from one roller on to another.

12. In a course indicator or the like, the combination of a sheet, an indicator to coöperate therewith, rollers between which the sheet extends, means for unrolling the sheet from one roller on to another, means for moving the indicator across the sheet, means for coördinating the movement of the sheet and indicator to obtain a resultant corresponding to the movement of a vehicle in a course over the earth's surface, a rotary threaded spindle, operative driving connections between said spindle and the sheet rollers, a nut mounted to travel along the spindle during rotation of the latter, and abutments so situated in relation to the nut and spindle that the former is brought into engagement with them when the drive of the sheet rollers is to be stopped.

13. In a course indicator or the like, the combination of two driven members, means for moving them rectilinearly in parallel planes but in directions at right angles to each other to indicate a course or the like by the resultant of their movements and adjustable alarm devices arranged to be operated when the driven members reach a selected point in their travel.

14. In a course indicator or the like, the combination of two driven members, means for moving them rectilinearly in parallel planes but in directions at right angles to each other to indicate a course or the like by the resultant of their movements, an alarm device, an operating circuit therefor, a movable contact in said circuit the movement of which is coördinated with the movement of one of the said driven members and relatively stationary contacts arranged to be engaged by the moving contact to complete the circuit when the driven members reach a selected point in their travel.

15. In a course indicator or the like the combination of two driven members, means for moving them rectilinearly in parallel planes but in directions at right angles to each other to indicate a course or the like by the resultant of their movements, an alarm device, an operating circuit therefor, two movable contacts in said circuit the movement of one of which is coördinated with the movement of one of the said driven members and the movement of the other contact coördinated with the movement of the other driven member, and relatively stationary contacts in said circuit arranged to be engaged by the moving contacts to complete the circuit when the driven members reach a selected point in their travel.

16. In a course indicator or the like the combination of two driven members, means for moving them rectilinearly in parallel planes but in directions at right angles to each other to indicate a course or the like by the resultant of their movements, an alarm device, an operating circuit therefor, two movable contacts in said circuit the movement of one of which is coördinated with the movement of one of the said driven members and the movement of the other contact coördinated with the movement of the other driven member, said contacts moving in directions at right angles to each other, and relatively stationary contacts in said circuit arranged to be engaged by the moving contacts to complete the circuit when the driven members reach a selected point in their travel.

17. In a course indicator or the like, the combination of a sheet, an indicator to coöperate therewith, rollers between which the sheet extends, means for unrolling the sheet from one roller on to another, means for moving the indicator across the sheet, means for coördinating the movement of the sheet and indicator to obtain a resultant corresponding to the movement of a vehicle in a course over the earth's surface, an alarm device, an operating circuit therefor, two movable contacts in said circuit the movement of one of which is coördinated with the movement of the sheet and the movement of the other coördinated with the movement of the indicator, said contacts moving in directions at right angles to each other, and relatively stationary contacts in said circuit arranged to be engaged by the moving contacts to complete the circuit when the sheet and indicator reach a selected point in their travel.

18. In a course indicator or the like the combination of two driven members, and driving means for moving them rectilinearly in parallel planes but in directions at right angles to each other to indicate a course or the like by the resultant of their movements, the driving means for each driven member comprising a pair of friction disks, a spring pressed member combined with one disk in each pair and tending normally to maintain it in engagement with its coöperating disk, a single operating member and connections between said operating member and both spring pressed members whereby the disks in each pair may be positively disengaged.

19. In a course indicator or the like, the combination of two driven members, and driving means for moving them rectilinearly in parallel planes but in directions at right angles to each other to indicate a course or the like by the resultant of their movements the driving means for each driven member comprising a pair of friction disks, a spring pressed member combined with one disk in each pair and tending normally to maintain it in engagement with its coöperating disk, a single operating member and cams adapted to be brought into engagement with the spring pressed members by the operating member to disengage positively the disks in each pair.

20. In a course indicator or the like, the combination of a sheet, an indicator to coöperate therewith, rollers between which the sheet extends, means for unrolling the sheet from one roller on to another, means for moving the indicator across the sheet, means for coördinating the movement of the sheet and indicator to obtain a resultant corresponding to the movement of a vehicle in a course over the earth's surface, a spring operatively connected to one of the sheet rollers to maintain the sheet taut, an operating member controlling the drive imparted to the sheet, a brake for the spring controlled roller and connections between said brake and said operating member whereby the brake is automatically brought into opertion when the operating member is brought into position to stop the drive imparted to the roller.

21. In a course indicator or the like, the combination of a sheet, an indicator to cooperate therewith, rollers between which the sheet extends, means for unrolling the sheet from one roller on to another, means for moving the indicator across the sheet, means for coördinating the movement of the sheet and indicator to obtain a resultant corresponding to the movement of a vehicle in a course over the earth's surface, the driving means for the rollers and indicator comprising a pair of friction disks, a spring pressed member combined with one disk in each pair and tending normally to maintain it in engagement with its coöperating disk, a single operating member, cams adapted to be brought into engagement with the spring pressed members by the operating member to disengage positively the disks in each pair and thus stop the drive, a spring operatively connected to one of the sheet rollers to maintain the sheet taut, a brake for the spring controlled roller and connections between said brake and said operating member whereby the brake is automatically brought into operation when the operating member is brought into position to stop the drive imparted to the roller.

22. In a course indicator, two members movable at right angles, and means capable of continuously driving both of said members, said means decreasing the speed of movement of one of said members inversely as the speed of the other of said members is increased to obtain a resultant corresponding to the movement of a vehicle in a course over the earth's surface, substantially as described.

23. In a course indicator, a charting member, means for moving said charting member, an indicator coöperating with said charting member, means for moving said indicator in a plane parallel to the movement of said charting member and at right angles thereto, and means for changing the direction of movement of said charting member and said indicator simultaneously, substantially as described.

24. In a course indicator or the like, the combination of two driven members comprising a map and an indicator to coöperate therewith, means for moving the map rectilinearly in the plane in which it lies, means for moving the indicator in a plane parallel to the said plane of the map, and in a direction at right-angles to the direction of movement of the map, means for coördinating the movement of the map and indicator to obtain a resultant corresponding to the movement of the vehicle in a course over the earth's surface, and a device to determine the relative speeds at which the two driven members require to be moved, comprising a transparent member 165 intended to be brought over the map and bearing upon it compass card graduations, and means for adjusting the transparent member and map relatively to each other to bring a desired course on the map which it is intended the vehicle should follow, more or less into register with one of said graduations, for the purposes specified.

25. In a course indicator or the like, the combination of two driven members comprising a sheet and an indicator to coöperate therewith, means for moving the sheet rectilinearly in the plane in which it lies, means for moving the indicator in a plane parallel to the said plane of the sheet and in a direction at right angles to the direction of movement of the sheet, means for coördinating the movement of the sheet and indicator to obtain a resultant corresponding to the movement of the vehicle in a course over the earth's surface, and a device to determine the relative speeds at which the two driven members require to be moved, comprising a transparent member 165 intended to be brought over the driven sheet and bearing upon it compass card graduations, and an adjustable support 166, 167, 168, 169, 170 for the said transparent member adapted to permit of adjustment thereof in two directions at right angles to each other, for the purposes specified.

In testimony whereof we have signed our names to this specification in the presence of two subscribing witnesses.

GERARD FORT BUCKLE.
FRANK PARFETT.

Witnesses:
ARTHUR ABBEY,
HARRY W. CHESLY.